United States Patent
Kim et al.

(10) Patent No.: US 7,833,657 B2
(45) Date of Patent: Nov. 16, 2010

(54) EXTERNAL CASE FOR SECONDARY BATTERIES AND SECONDARY BATTERY USING THE EXTERNAL CASE

(75) Inventors: Heongsin Kim, Yongin-si (KR); Woonseong Baek, Yongin-si (KR); Myungjun Lee, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 69 days.

(21) Appl. No.: 12/000,925

(22) Filed: Dec. 18, 2007

(65) Prior Publication Data

US 2008/0166628 A1  Jul. 10, 2008

(30) Foreign Application Priority Data

Jan. 10, 2007  (KR) ........................ 10-2007-0002951

(51) Int. Cl.
*H01M 2/10*  (2006.01)
(52) U.S. Cl. ........................ 429/163; 429/162; 429/7; 429/175; 429/185; 429/96
(58) Field of Classification Search ............... 429/96, 429/97, 173, 163; 326/703; 229/110
See application file for complete search history.

(56) References Cited

U.S. PATENT DOCUMENTS

| 2,984,401 | A  | * | 5/1961 | Herkender ................. 229/110 |
| 4,010,043 | A  | * | 3/1977 | Schneider ................. 29/592.1 |
| 4,434,903 | A  | * | 3/1984 | Cooke ........................ 215/222 |
| 6,258,480 | B1 | * | 7/2001 | Moriwaki et al. ........... 429/176 |
| 7,361,428 | B2 | * | 4/2008 | Watanabe et al. ............. 429/96 |
| 2004/0038125 | A1 | * | 2/2004 | Kim et al. .................. 429/162 |
| 2005/0208345 | A1 | * | 9/2005 | Yoon et al. .................... 429/7 |

FOREIGN PATENT DOCUMENTS

WO  WO 99/13520  3/1999

* cited by examiner

*Primary Examiner*—Melvin C Mayes
*Assistant Examiner*—Colette Nguyen
(74) *Attorney, Agent, or Firm*—Robert E. Bushnell, Esq.

(57) ABSTRACT

An external case for secondary batteries, and a secondary battery using the external case, in which the covering surfaces for the lower surface and side surfaces of a pouch type core pack are joined to prevent unfolding due to the resilience of the material. The external case includes: a base covering the lower surface of the pouch type cell, a pair of sidewalls joined to two opposing longer edges of the base to respectively form single linear boundaries, and covering two broad side surfaces of the pouch type cell, and skirts extending from two longer edges of each of the sidewalls, and covering two narrow side surfaces of the pouch type cell. The base, sidewalls, and skirts are all formed of a metallic material.

9 Claims, 5 Drawing Sheets

EXTERNAL CASE FOR SECONDARY BATTERIES AND SECONDARY BATTERY USING THE EXTERNAL CASE

CLAIM OF PRIORITY

This application makes reference to, incorporates the same herein, and claims all benefits accruing under 35 U.S.C. §119 from an application earlier filed in the Korean Intellectual Property Office on the 10$^{th}$ of Jan. 2007 and there duly assigned Serial No. 10-2007-0002951.

BACKGROUND OF THE INVENTION

1. Field of the Invention

The present invention relates to an external case for secondary batteries and a secondary battery using the external case, and more particularly, the present invention relates to an external case formed of a metallic material, in which the covering faces for the lower surface and side surfaces of a pouch type core pack are joined such that unfolding due to the resilience of the material is prevented, and so that an increase in the thickness or volume of the battery to be cased is minimized.

2. Description of the Related Art

As there are ongoing increases in the use of portable wireless electronic instruments such as mobile telephones, Personal Digital Assistants (PDAs), digital cameras and the like, and in the weight reduction of electric bicycles, electric vehicles, electric tools and the like, the importance of batteries that are used as the driving power supply for these products is being highlighted, and research is being conducted extensively on the batteries.

In particular, rechargeable lithium secondary batteries have a high energy density per unit weight compared with existing lead acid batteries, nickel-cadmium batteries, nickel-hydrogen batteries, nickel-zinc batteries and the like, due to the lightweight characteristic of lithium atoms, and are also capable of fast charging. Thus, active research is being conducted on further development of the lithium secondary batteries.

Lithium secondary batteries use non-aqueous electrolytes because of the reactivity between lithium and moisture. These electrolytes may be solid polymers containing a lithium salt, or liquids in which a lithium salt is dissociated from an organic solvent.

Furthermore, according to the type of electrolyte, lithium batteries can be classified as lithium metal batteries and lithium ion batteries, both using liquid electrolytes, and lithium ion polymer batteries using polymeric solid electrolytes. The lithium ion polymer batteries can be also classified, according to the type of polymeric solid electrolyte, as all-solid type lithium ion polymer batteries which do not contain an organic liquid electrolyte, and gel type lithium ion polymer batteries which use a gel type polymeric electrolyte containing organic liquid electrolyte.

While the all-solid type lithium ion polymer batteries do not suffer from a problem of the leakage of organic liquid electrolyte, the gel type lithium ion polymer batteries containing an organic liquid electrolyte may have the problem of leakage of the organic liquid electrolyte. However, the liquid electrolyte leakage problem of such gel type lithium ion polymer batteries is ignorable when compared with those lithium ion batteries using a liquid electrolyte. Thus, the liquid electrolyte leakage problem can be prevented by using a multilayer pouch consisting of a sheet of metal foil and one or more polymeric membranes covering this foil. In other words, lithium ion batteries use a firm metal can with considerable strength to prevent leakage of the liquid electrolyte, whereas gel type lithium ion polymer batteries can sufficiently prevent the liquid electrolyte leakage problem simply by means of the multilayer pouch, since the risk of liquid electrolyte leakage is significantly lower in the case of gel type lithium ion polymer batteries than in the case of lithium ion batteries.

Furthermore, using a multilayer pouch is also advantageous in that the weight of the secondary battery can be remarkably reduced, as compared with the case of using a metal can.

The pouch membrane forming the multilayer pouch consists of a sheet of metal foil and polymeric membranes attached to both sides thereof. Aluminum is usually used for the metal foil. The polymeric membranes forming the inner side of the pouch membrane are typically formed of a material which is capable of thermal adhesion, and a polyethylene or polypropylene resin is usually used for the purpose, thereby protecting the metal foil from the electrolyte and preventing short circuits between the anode and the cathode of the secondary battery as well as between the electrode tabs.

In recent years, a configuration conventionally referred to as "hard pack", in which a protection circuit board is connected to a pouch type bare cell to form a corepack, and the corepack covered with a external case which is then sealed, is widely used. The external case is of a box type having a lower body and an upper cover, with the upper part being open. Such a external case is usually formed of polypropylene resin or the like.

However, since conventional external cases used for the hard pack for pouch type batteries as described above are formed of a synthetic resin, such as polypropylene resin or the like, such hard pack batteries are advantageously lightweight, while being weak in strength. Thus, the external case is easily pressed by an external force, and as a result, the external case itself, or the pouch type battery covered by the external case is easily deformed either in the inward direction or the outward direction. Especially in the case where the external case is deformed in the inward direction toward the battery, the deformed external case exerts a pressure on the bare cell including the pouch, and the protection circuit board or electrode tabs of the pouch type battery may be moved, thereby causing a risk of internal short circuits. Furthermore, the pouch which is relatively weaker in strength may become subject to damage such as tearing, so that the structural safety of the battery in general may be deteriorated.

In addition, in order to address the problems associated with production of external cases from synthetic resins as described above, the external cases may be produced from a metallic material. However, since metallic materials have a feature of exhibiting relatively large resilience or restorability upon bending, external cases made of metal tend to form a surface which is convex in the outward direction from the bent parts, and as a result, the covered pouch type batteries have a problem of acquiring unnecessarily large volumes regardless of the battery capacity. This leads to a large volumetric size of the hard pack batteries regardless of the battery capacity.

Moreover, conventional hardcases made of metal continuously tend to undergo unfolding because of the resilience or restorability of the material itself, during the assembling operation after the external cases are placed to cover the pouch type batteries. Thus, the operations to finish hard pack batteries, such as assembling a hardcase while a pouch type battery is already covered, labeling external cases, and the like, may become very difficult.

SUMMARY OF THE INVENTION

The present invention solves such problems as described above, and it is an object of the present invention to provide a external cases for secondary batteries, which is formed of a metallic material and has a structure in which unfolding due to the resilience of the material at the bent parts between joined surfaces is suppressed, the hardcase casing a battery with a thickness and a volume that are appropriate as compared with the battery capacity, and having a fortified function for protecting a pouch type battery based on the characteristics of the metallic material.

Furthermore, it is another object of the present invention to provide a external cases for secondary batteries, which is designed such that large resilience and a phenomenon of unfolding resulting therefrom, which appear at bent parts of a metallic material during an assembling operation dealing with a pouch type secondary battery covered with the external case, can be prevented, thus allowing an assembling operation for hard pack type secondary batteries or a labeling operation after the assembling operation to be smoothly accomplished.

It is also another object of the present invention to provide a secondary battery having a external case which is made of a metallic material, and is designed to prevent the resilience appearing at the bent parts, in which battery volumetric increases due to the external case as compared with the battery capacity are prevented, and the structural stability can be improved.

In order to achieve the objects as described above, the present invention provides, according to one aspect thereof, a external case for secondary batteries using pouch type cells, the external case including a base covering the lower surface of the pouch type cell; a pair of sidewalls joined to two opposing longer edges of the base to respectively form single linear boundaries, and covering two broad side surfaces of the pouch type cell; and skirts extending from two longer edges of each of the sidewalls, and covering two narrow side surfaces of the pouch type cell. The base, sidewalls and skirts are all formed of a metallic material.

The base and each of the sidewalls may be joined at an angle of 90°, while respectively covering the lower surface and the broad side surfaces.

The base and each of the sidewalls may be joined to each other, while having a groove-like bending line to form a single linear boundary.

The skirts extending from the longer edges of each of the sidewalls may cover the narrow side surfaces of the pouch type cell such that the skirts on one broad side surface partially or entirely overlap the skirts on the other broad surface, and a locking arrangement to join the two overlapped skirts may be provided for the purpose. The locking arrangement may include a plurality of locking lugs formed on the outer skirt of the two overlapped skirts, and a plurality of locking holes formed on the inner skirt, into which the locking lugs are inserted.

Furthermore, a step is formed along the longer edge of the inner skirt of the two overlapped skirts, and the verge at the longer edge of the outer skirt is placed on the step, so that the two skirts can be overlapped while forming a horizontally even structure at the joint. A locking arrangement may be provided to join the step of the inner skirt with the verge at the longer edge of the outer skirt to be placed thereon, and the locking arrangement may include a plurality of locking holes formed on the step of the inner skirt, and a plurality of locking lugs formed on the verge at the longer edge of the outer skirt to be inserted into the locking holes.

According to another aspect, the present invention provides a secondary battery including a rechargeable pouch type cell; a protection circuit board having a protection circuit formed thereon and being electrically connected to the pouch type cell; and a external case made of a metallic material, which includes a base covering the lower surface of the pouch type cell; a pair of sidewalls joined to two opposing longer edges of the base to respectively form single linear boundaries, and covering two broad side surfaces of the pouch type cell; and skirts extending from two longer edges of each of the sidewalls, and covering two narrow side surfaces of the pouch type cell.

The secondary battery may further include a protective case, which is installed between the pouch type cell and the protection circuit board.

The protective case may have locking lugs formed on both side surfaces in the direction of the thickness of the pouch type cell, and the hardcase may have locking holes formed on the sidewalls, into which holes the locking lugs are inserted. The external case may have a plurality of joints extending from the upper end so as to face the protective case, and the joints may have locking holes formed thereon.

The secondary battery may further include an upper cover which covers the protection circuit board, the electric connection between the protection circuit board and the pouch type cell, and the upper end of the external case, and prevents them from being exposed to the outside, and is joined to the upper part of the pouch type cell; and a lower cover which covers the lower end of the external case from the outside, and is joined to the lower part of the pouch type cell.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of an external case for secondary batteries according to the present invention, and for a secondary battery using the external case are described in detail below with reference to the attached drawings.

Figure 1:
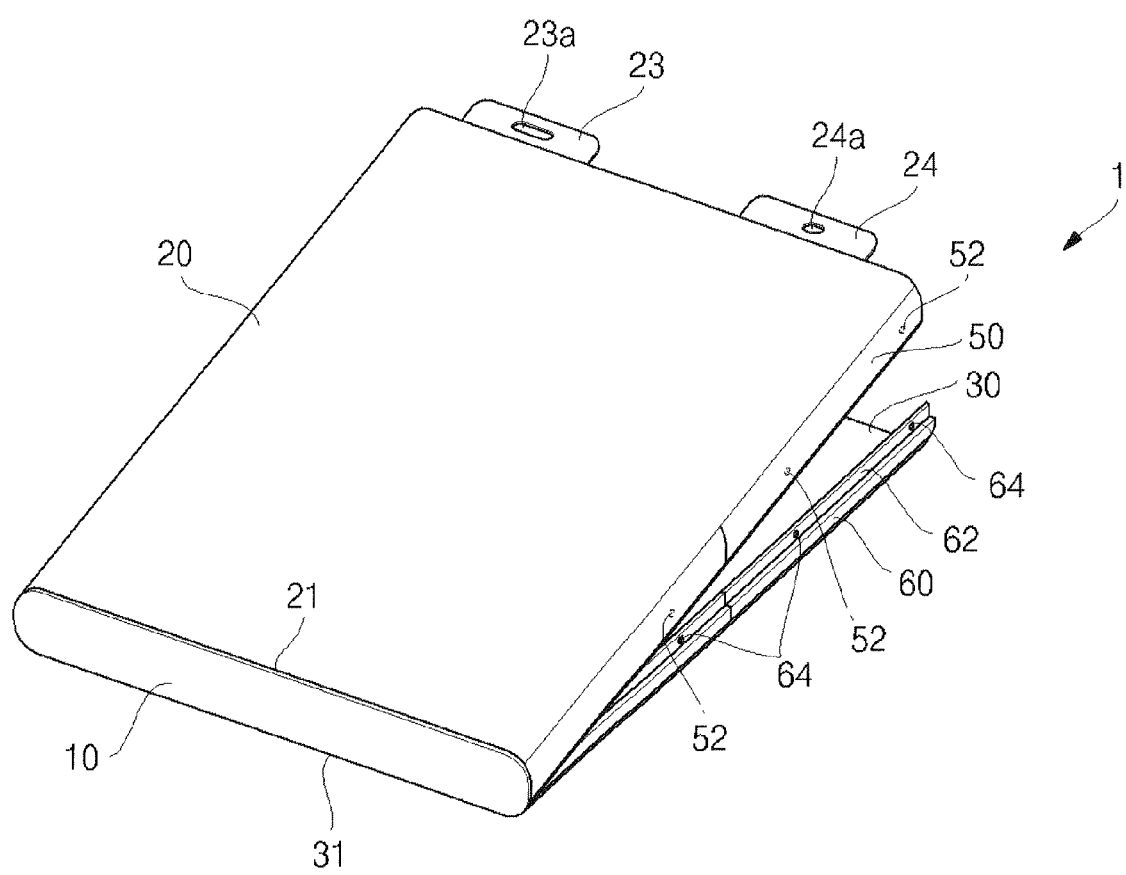
FIG. 1 is a perspective view of an external case for secondary batteries according to an embodiment of the present invention.
Figure 2:
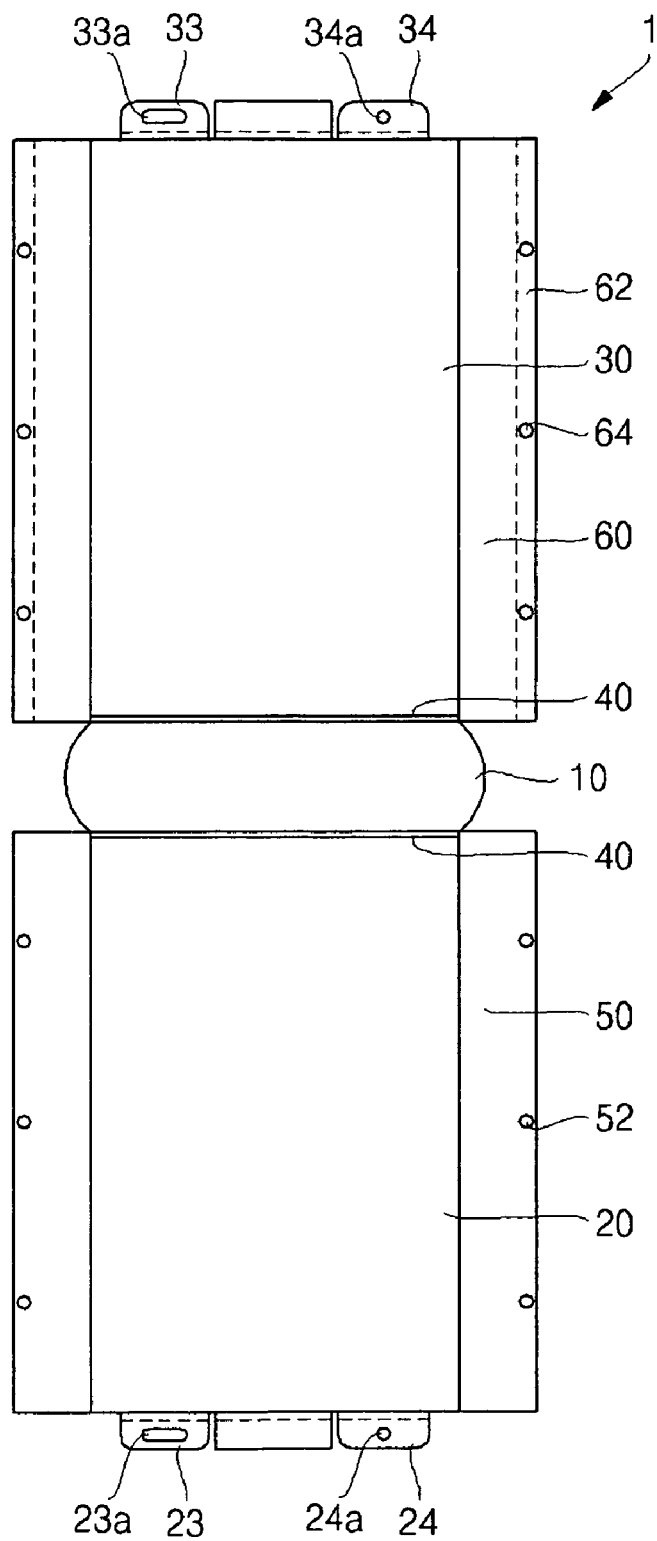
FIG. 2 is a development figure of the external case according to the embodiment of FIG. 1.
Figure 3:
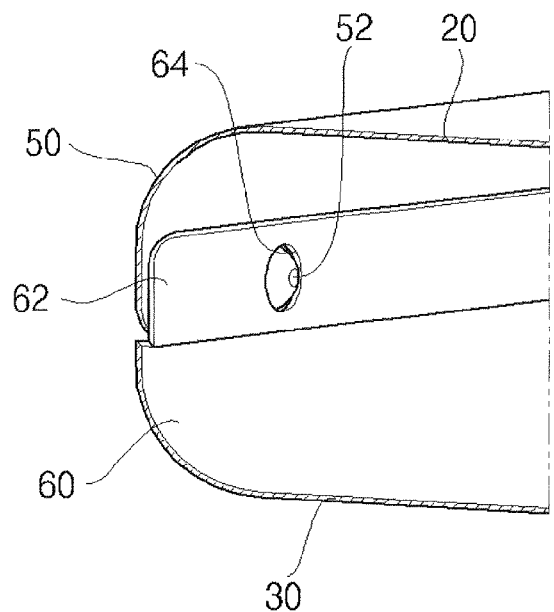
FIG. 3 is a perspective view of a partial section including parts of the external case according to the embodiment of FIG. 1.
Figure 4:
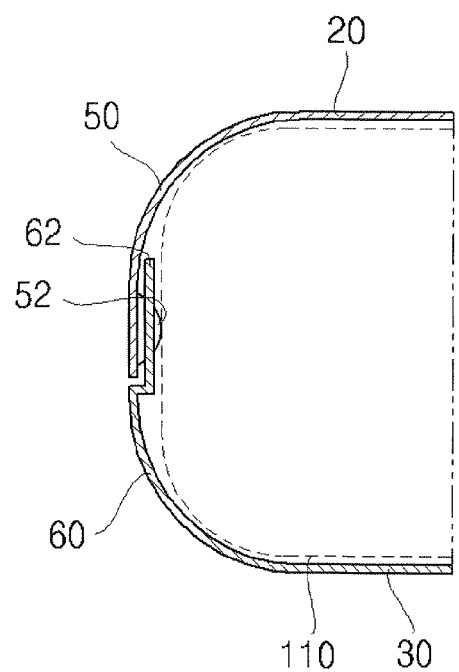
FIG. 4 is a cross-sectional view of the external case according to the embodiment of FIG. 3.
Figure 5:
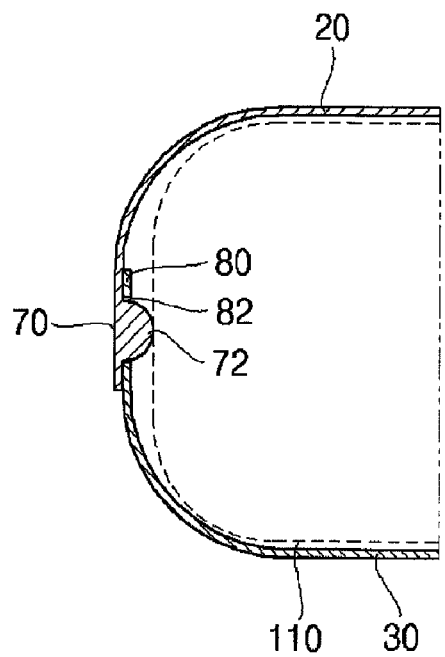
FIG. 5 is a cross-sectional view of an external case for secondary batteries according to another embodiment of the present invention.
Figure 6:
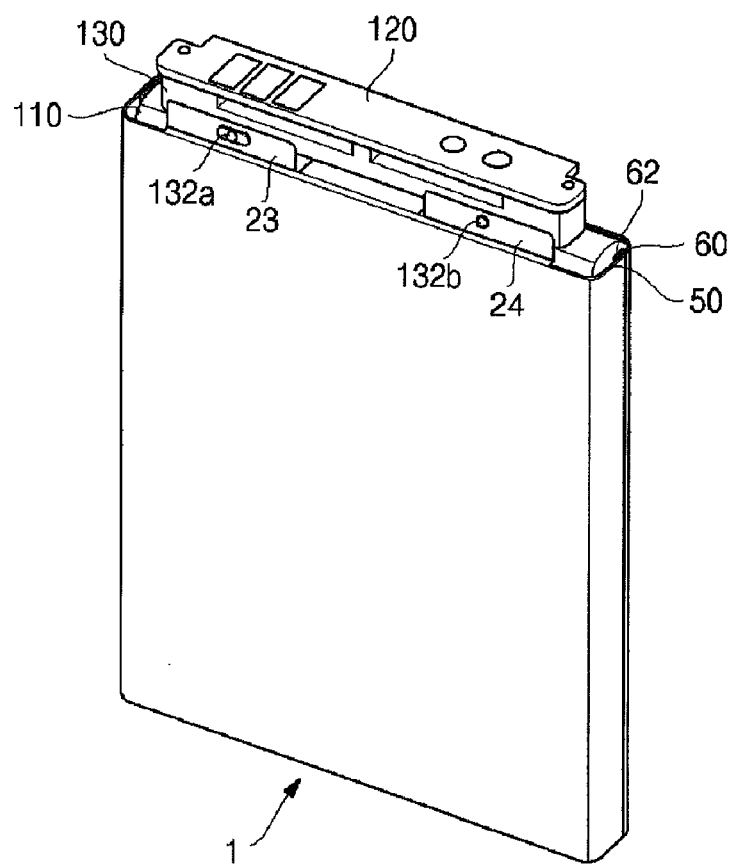
FIG. 6 is a perspective view of an external case joined to a secondary battery core pack according to an embodiment of the present invention.
Figure 7:
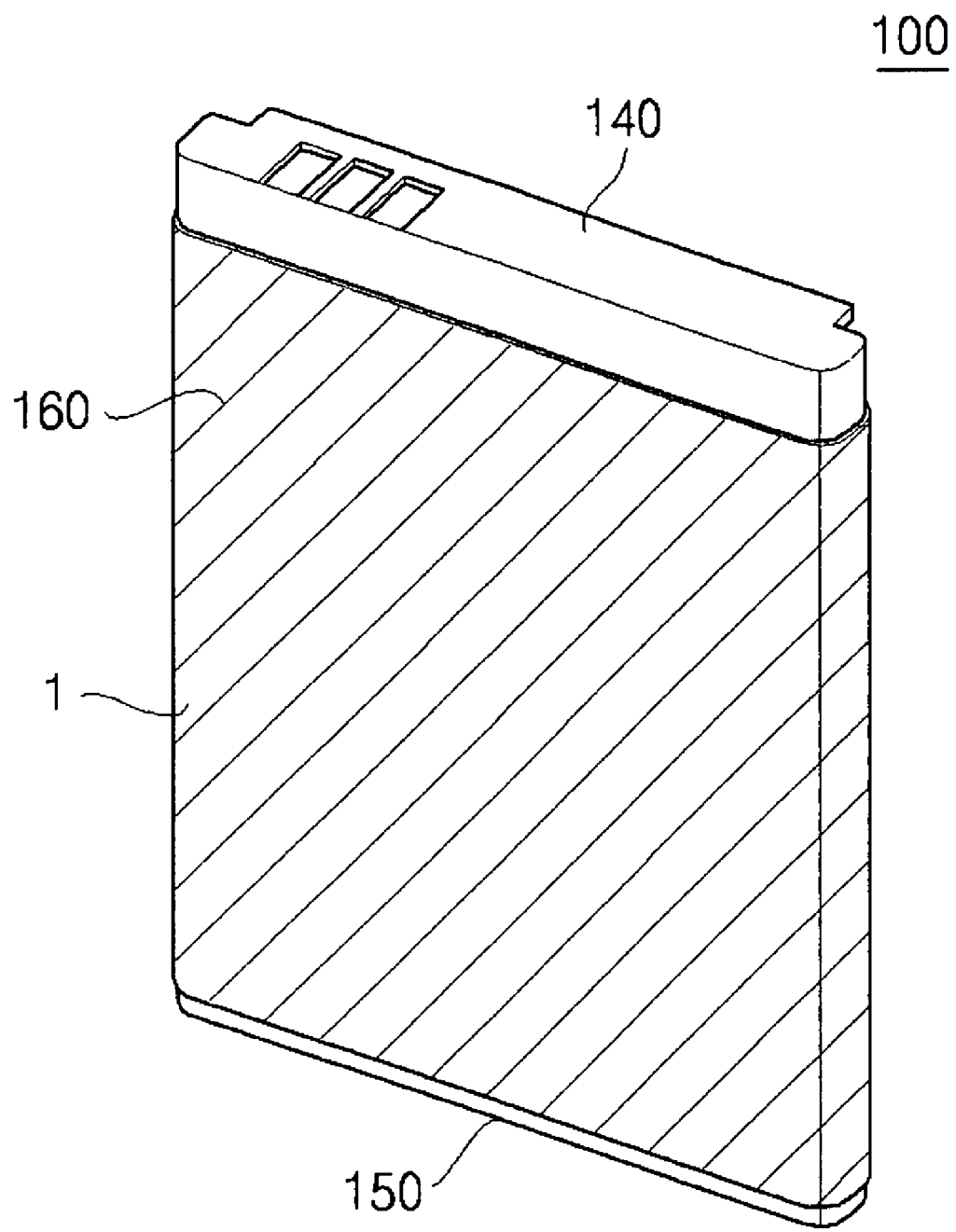
FIG. 7 is a perspective view of the final completed state of the secondary battery according to the embodiment of FIG. 6.

FIG. 1 is a perspective view of an external case for secondary batteries according to an embodiment of the present invention, and FIG. 2 is a development figure of the external case according to the embodiment of FIG. 1. FIG. 3 is a perspective view of a partial section of parts of the external case according to the embodiment of FIG. 1, and FIG. 4 is a cross-sectional view of the external case according to the embodiment of FIG. 3. Furthermore, FIG. 5 is a cross-sectional view of an external case for secondary batteries according to another embodiment of the present invention. FIG. 6 is a perspective view of an external case joined to a core pack of a secondary battery according to an embodiment of the present invention, and FIG. 7 is a perspective view of the final completed state of a secondary battery according to the embodiment of FIG. 6.

Prior to the following explanation, the term "hard pack battery" refers to a battery in which a core pack formed by combining a bare cell and a protection circuit board, is covered with an external case, which is usually called a hard case. Since such a hard pack battery is a term widely used in the field of secondary batteries, it is understood that the term "hard pack battery" will be used in some parts of the following description of the present invention.

An external case for hard pack batteries according to an embodiment of the present invention is described below with reference to FIGS. 1 to 4.

As illustrated in the drawings, the external case 1 according to the present invention includes a base 10, sidewalls 20 and 30 and skirts 50 and 60. The base 10, the sidewalls 20 and 30 and the skirts 50 and 60 are all formed of a metallic material.

The base 10 covers the lower surface of a pouch type cell. The side where electrode terminals or electrode tabs of the pouch type cell are located is defined as the upper side of the pouch type cell, and the lower surface of the pouch type cell refers to a surface located on the opposite side of the electrode terminals or electrode tabs.

A pair of sidewalls 20 and 30 are joined to the two opposing longer edges of the base 10, and the pair of sidewalls 20 and 30 and the two longer edges of the base 10 together respectively form linear boundaries 21 and 31 as single linear structures. In other words, the boundaries between the base 10 and the two sidewalls 20 and 30 are joined to form an angle with no curvature, and as a result, the base 10 and the pair of sidewalls 20 and 30 are all formed of a metallic material, the pair of sidewalls 20 and 30 are not subject to unfolding due to the resilience of the material itself, as long as there is no external force exerted thereon.

Furthermore, in the structure in which the pair of sidewalls 20 and 30 and the longer edges of the base 10 are joined to each other to form single linear boundaries 21 and 31, as illustrated in FIG. 2, the lower end of each of the sidewalls 20 and 30 may be joined to the longer edge of the base 10, with a groove-like bending line 40 formed therebetween. The bending line 40 can be formed by sheet metal working or other various processes, and during the process for producing external cases, the bending line 40 may be formed in advance so that the sidewalls 20 and 30 can be bent from the longer edges of the base 10 while forming single linear boundaries 21 and 31. After the bending, the structure thus formed is not subject to unfolding due to the resilience of the material itself.

The pair of sidewalls 20 and 30 described above are intended to cover two broad side surfaces of the pouch type cell, and as described above, in view of the characteristic structure which does not easily undergo unfolding due to the resilience of the material itself while the pair of sidewalls 20 and 30 can be closely attached to the two broad side surfaces of the pouch type cell. As a result, there is no unnecessary space formed as gaps between the two broad side surfaces and the inner surfaces of the sidewalls 20 and 30, and this results in prevention of a phenomenon in which the general volume of the hard pack battery is extended more than necessary, as compared with the capacity of the pouch type cell. In particular, when the sidewalls 20 and 30 are joined to the perimeter of the base 10 at an angle of 90°, while covering the broad side surfaces of the pouch type cell, factors that are causative of generating unnecessary spaces, which can be formed between the pouch type cell an the hardcase, can be further eliminated.

Furthermore, during an operation of forming a hard pack battery from a pouch type cell using a metal hard case 1, since the two broad side surfaces of the pouch type cell are covered while making the sidewalls 20 and 30 of the hard case not likely to unfold easily as described above, a series of processes to form hard pack batteries by covering pouch type cells with hard cases 1 can be more readily conducted. For example, as described above, the sidewalls 20 and 30 are attached to the two broad side surfaces of the pouch type cell such that the sidewalls do not easily undergo unfolding due to the resilience of the material itself. Thus, the deformation of the external case 1, such as by indentations, which can occur due to the separation between the external case 1 and the pouch type cell, is prevented, and as a result, the operation of labeling, which corresponds to the final step of the production of hard pack batteries, can be smoothly accomplished.

In addition, since the skirts 50 and 60 respectively extend from two longer edges of each of the sidewalls 20 and 30, the skirts cover two narrow side surfaces of the pouch type cell. Furthermore, the skirt 50 extending from the longer edges of each of the sidewalls may overlap the skirt 60 from the opposite side to cover the narrow side surfaces of the pouch type cell. Accordingly, no contacting type crevices occur at the interface between the two skirts 50 and 60, and the introduction of foreign substances, which can occur through contacting type crevices of the skirts 50 and 60, does not occur.

Moreover, as described above, since the two skirts 50 and 60 overlap each other to cover a narrow side surface of the pouch type cell, the two skirts 50 and 60 may be provided with a physical locking arrangement to join the two skirts 50 and 60. The locking arrangement may include a plurality of locking lugs 52 formed on one skirt 50 arranged on the outside, and a plurality of locking holes 64 formed on the other skirt 60 arranged on the inside, into which the plurality of locking lugs 52 are inserted and fixed. When the two skirts 50 and 60 are joined by the locking arrangement, the operation of covering the narrow side surface of the pouch type cell by joining the two skirts 50 and 60 can be conveniently accomplished. Also, the two skirts 50 and 60 can be repeatedly separated and rejoined, if necessary.

It is desirable that the two skirts 50 and 60 overlap each other to cover a narrow side surface of the pouch type cell, such that sill-like projections resulting from the superposition between the two skirts 50 and 60 are not produced on the narrow side surface of the pouch type cell. That is, a step 62 is formed on the skirt 60 arranged on the inner side, and a verge at a longer edge of the skirt 50 arranged on the outer side is placed on the step 62, thereby allowing the faces between the two skirts 50 and 60 to form a horizontally even structure. Furthermore, the step 62 of the inner side skirt 60 and the verge at the longer edge of the outer side skirt 50 can be joined together by a physical locking arrangement. The locking arrangement may include a plurality of locking holes 64 formed on the step 62, and a plurality of locking lugs 52 formed on the inner side of the verge at the longer edge of the outer side skirt 50 and inserted into the locking holes 64 to be fixed.

FIG. 5 illustrates a different structure of the superposed skirts, and as depicted therein, the two superposing skirts 70, 80 are not in the form of being evenly bound by means of a step, and thus, sill-like projections corresponding to the thickness of one skirt at the superposed part are formed. Thus, the two skirts 70, 80 superposed as such can be joined by a locking means, and the locking means used herein may include a plurality of locking lugs 72 formed on the outer side skirt 70, and a plurality of locking holes 82 formed on the inner side skirt 80, into which holes the locking lugs 72 are inserted.

FIG. 6 is a view of a hard pack battery using a external case according to the embodiments shown in FIG. 1 to FIG. 4, and FIG. 7 is a perspective view of the final completed form of the secondary battery according to the embodiment of FIG. 6.

As illustrated in FIG. 6, the hard pack battery according to the embodiment of the present invention includes a core pack containing a pouch type cell 110 and a protection circuit board 120, and a external case 1.

The pouch type cell 110 is a rechargeable secondary battery, and such a pouch type cell 110 may be a conventional pouch type cell, such as the widely used lithium ion polymer battery.

The pouch type cell 110 is covered such that an electrode assembly is sealed inside a pouch composed of a multilayer membrane structure, and the multilayer membrane pouch is formed from a sheet of metal foil and polymer membranes attached to both sides of the metal foil. Typically, aluminum is used as the metal forming the metal foil. The polymer membrane forming the inner side of the pouch is typically a material capable of thermal adhesion, and polyethylene or polypropylene resins are usually used for this purpose, to protect the metal foil from the electrolyte as well as to prevent short circuits between the anode and cathode of the electrode assembly and between the electrode tabs.

The protection circuit board 120 has a protection circuit for the pouch type cell 110 formed thereon, and such a protection circuit board 120 typically includes various electronic devices mounted on a Printed Circuit Board (PCB). The protection circuit board 120 is electrically connected to the pouch type cell 110, and the configuration in which a protection circuit module including the protection circuit board 120 is connected to the pouch type cell 110 as such, is conventionally referred to as a core pack.

Such core pack is covered by the external case 1, and since the structure of the external case 1 has been explained for the embodiments of FIG. 1 to FIG. 4, a detailed description thereof has been omitted here. Although not illustrated in the drawings, the configuration may be achieved by adhering double-sided adhesive tape on the contacting surface between the external case 1 and the pouch type cell 110, that is, on either the inner surface of the external case 1 or the outer surface of the pouch type cell 110, and adhering the inner surface of the hardcase 1 to the outer surface of the pouch type cell 110 via the double-sided adhesive tape, to thus accomplish casing of a core pack.

As such, in the case of forming a hard pack by housing a corepack in a external case, as can be seen from the embodiments of FIG. 1 to FIG. 4, when the two sidewalls 20 and 30 of the hardcase 1 are closely adhered to two broad side surfaces of the pouch type cell 110, there is no unnecessary space formed as gaps between the two broad side surfaces of the pouch type cell 110 and the inner surfaces of the side walls 20 and 30 of the external case 1. As a result, the phenomenon in which the general volume of the hard pack battery 100 is extended more than necessary as compared with the battery capacity of the pouch type cell 110, is prevented; in other words, the hard pack battery can be produced to have a volume equivalent to the battery capacity of the pouch type cell 110.

Furthermore, since the sidewalls 20 and 30 of the external case 1 cover the two broad side surfaces of the pouch type cell 110 while not being likely to unfold, a series of processes for forming a hard pack battery by covering the pouch type cell 110 with a hardcase 1, can be more easily conducted.

When the skirts 50 and 60 of the external case 1 overlap each other to cover narrow side surfaces of the pouch type cell 110, a physical locking arrangement is provided to join the skirts 50 and 60, and the skirts 50 and 60 that are joined by such a locking arrangement are joined to each other in the form of an assembly. Accordingly, the two joined skirts 50 and 60 can be easily separated and rejoined as necessary, and the two skirts 50 and 60 can be joined without using welding, an adhesive, or the like, thus improving workability.

The hard pack type secondary battery according to the current embodiment of the present invention may further include a protective case 130. The protective case 130 is arranged between the pouch type cell 110 and the protection circuit board 120, and the protective case 130 covers the electrical connection structure between the pouch type cell 110 and the protection circuit board 120 to prevent the connection structure from moving around as well as protecting the connection structure, by preventing a short circuit caused by the contact between the electrode tabs of the pouch type cell 110 and the external case 1, and the like.

The protective case 130 also includes a plurality of locking lugs 132*a* and 132*b* formed on both side surfaces lying in the thickness direction of the pouch type cell 110, and the protective case 130 can be configured to be joined to the upper end of the external case 1 by the locking lugs 132*a* and 132*b* in an assembled form. Referring to FIG. 6, two pairs of locking lugs 132*a* and 132*b* are respectively formed on both side surfaces of the protective case 130, and locking holes 23*a*, 24*a*, 33*a*, and 34*a* are formed at the upper end of the external case 130 such that the locking lugs 132*a* and 132*b* are inserted into the locking holes and fixed.

Since it is not necessary for the entire upper end of the hardcase 1 be formed up to a height corresponding to the locking lugs 132*a* and 132*b* of the protective case 130, it is preferable to have a configuration such that the joints 23, 24, 33, and 34 forming the locking holes 23*a*, 24*a*, 33*a*, and 34*a* at the upper end of the external case 1 are extended to allow the locking lugs 132*a* and 132*b* of the protective case 130 to be inserted into the locking holes 23*a*, 24*a*, 33*a*, and 34*a* and fixed.

As such, when the upper part of the external case 1 is joined to the protective case 130, the external case 1 can exert strengthen the joining of the pouch type cell 110 and the protective case 130, and can also be expected to have an effect of allowing the external case 1 to be more firmly joined to the core pack.

In addition, the locking lugs 132*a* and 132*b* that are formed on the protective case 130 as can be seen from the current embodiment, may form a pair of locking lugs having a circular cross-section and a rectangular cross-section, respectively, on the basis of any one side of the protective case 130. However, the present invention is not limited thereto, and the present invention can be modified in various configurations such as that the pair of locking lugs both have circular cross-sections or rectangular cross-sections, and the like.

Also, the secondary battery according to the embodiment of FIG. 6 has the protection circuit module including the protection circuit board exposed to the outside, and the contacting parts between the upper and lower ends of the external case and the corepack are also exposed. Thus, upon considering the structural safety of the secondary battery, it is preferable to cover the part corresponding to the protection circuit module, and the upper and lower ends of the external case, from such exposure. For this purpose, as illustrated in FIG. 7, the secondary battery 100 according to the present invention may further include an upper cover 140 and a lower cover 150.

In other words, the upper cover 140 protects the protection circuit board 120 and the electric connection structure, which is located between the protection circuit board 120 and the upper end of the pouch type cell 110, from the outside, and is joined to the upper part of the pouch type cell 110 such that the upper cover shields the upper end of the external case 1 from the outside. The lower cover 150 is joined to the lower end of the pouch type cell 110 such that the lower cover shields the lower end of the hardcase 1 from the outside. Furthermore, the part between the upper cover 140 and the lower cover 150 of the secondary battery 100, which is covered by the upper cover 140 and the lower cover 150 as such, is wrapped with a label 160, and the final finish of the secondary battery 100 is thus accomplished.

It is also possible to contemplate a configuration in which the protection circuit module and the pouch type cell are joined and covered by a molding formed of a resin molded by insert injection molding or the like, instead of the upper cover.

As is disclosed by the above-described embodiments, the external case for secondary batteries according to the present invention, and the secondary batteries using the external case can maximally reduce the factors for volumetric increases resulting from the resilience of the bent parts of a metallic external case for hard pack type secondary batteries, thus allowing a secondary battery thus produced to have an appropriate volume as compared with the battery capacity, and of improving the structural stability due to the characteristics of the metallic material forming the external case.

There is also an effect that the assembling operation for the external case covering a pouch type cell, or the subsequent labeling operation can be smoothly accomplished, as the factors for volumetric increases resulting from the resilience of the bent parts of the external case, which is formed of a metallic material, are maximally reduced.

What is claimed is:

1. An external case for a secondary battery including a pouch type cell, the external case comprising:
   a base covering a lower surface of the pouch type cell;
   a pair of sidewalls joined with two opposing longer edges of the base to respectively form single linear boundaries, and covering two broad side surfaces of the pouch type cell;
   overlapping skirts extending from two longer edges of each of the sidewalls, and covering two narrow side surfaces of the pouch type cell;
   a plurality of semispherical locking lugs arranged on an outer side skirt of the overlapping skirts; and
   a plurality of circular locking holes arranged on an inner side skirt of the overlapping skirts into which the plurality of locking lugs are inserted, diameters of the plurality of circular locking holes correspond to diameters of the semispherical locking lugs,
   wherein the base, sidewalls, and skirts are of a metallic material.

2. The external case according to claim 1, wherein the base and each of the sidewalls are joined at an angle of 90°, while respectively covering the lower surface and a broad side surface of the pouch type cell.

3. The external case according to claim 1, wherein the base and each of the sidewalls are joined to each other, while having a groove-like bending line to form a single linear boundary.

4. The external case according to claim 1, wherein the skirts respectively extending from longer edges of each of the sidewalls cover the narrow side surfaces of the pouch type cell, while at least partially overlapping the skirts from the opposite side.

5. The external case according to claim 4, wherein a step is formed along a longer edge of the inner side skirt of the two overlapping skirts, and the verge at a longer edge of the outer side skirt is arranged on the step, the two skirts being overlapped while forming a horizontally even structure at a joint therebetween.

6. The external case according to claim 5, wherein the plurality of circular locking holes arranged on the step of the inner side skirt, and the plurality of semispherical locking lugs arranged at the verge of the longer edge of the outer side skirt to be inserted into the locking holes.

7. A secondary battery comprising:
   a rechargeable pouch type cell;
   a protection circuit board having a protection circuit for the pouch type cell arranged thereon, the protection circuit board being electrically connected to the pouch type cell;
   a protective case arranged between the pouch type cell and the protection circuit board; and
   an external case of a metallic material, the external case including:
      a base to cover the lower surface of the pouch type cell;
      a pair of sidewalls joined to two opposing longer edges of the base to respectively form single linear boundaries, and covering two broad side surfaces of the pouch type cell; and
      skirts extending from two longer edges of the sidewalls, and covering two narrow side surfaces of the pouch type cell,
      wherein the protective case comprises semispherical locking lugs arranged on both side surfaces along the thickness direction of the pouch type cell, the external case having circular locking holes arranged on the sidewalls, the semispherical locking lugs being inserted into the circular locking holes.

8. The secondary battery according to claim 7, wherein the external case comprises a plurality of joints extending from the upper end to face the protective case, the joints having the circular locking holes arranged thereon.

9. The secondary battery according to claim 7, further comprising an upper cover covering and protecting the protection circuit board, the electric connection part of the protection circuit board and the pouch type cell, and the upper end of the external case, from being exposed to the outside, and joined to the upper part of the pouch type cell; and a lower cover covering and protecting a lower end of the hard case from being exposed to the outside, and being joined to a lower part of the pouch type cell.

* * * * *